C. B. Curtis,
Grinding Harvester Knives.
N° 82,808.  Patented Oct. 6, 1868.
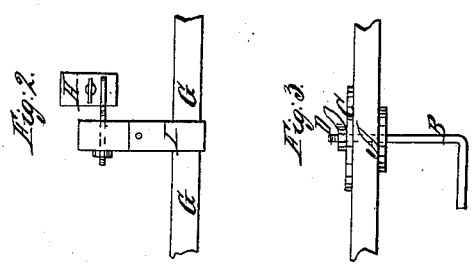
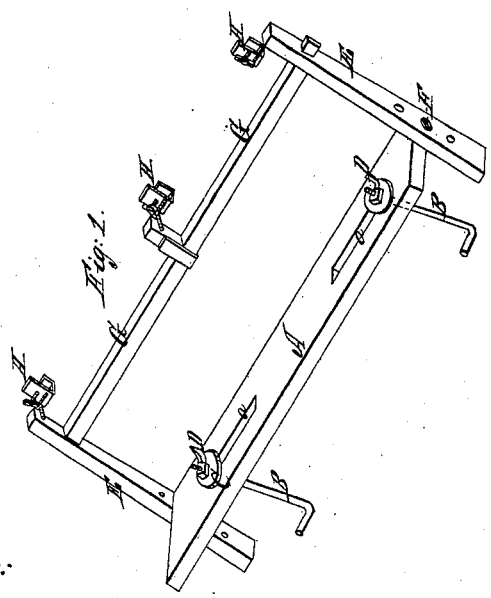
Witnesses:  
Chas. F. Clausen  
Inventor:  
Charles B. Curtis  
by D. P. Holloway & Co.  
his attys

United States Patent Office.

CHARLES B. CURTIS, OF JORDAN, NEW YORK.

Letters Patent No. 82,808, dated October 6, 1868.

IMPROVEMENT IN MACHINE FOR GRINDING CUTTERS OF MOWING-MACHINES.

*The Schedule referred to in these Letters Patent and making part of the same.*

TO ALL WHOM IT MAY CONCERN:

Be it known that I, CHARLES B. CURTIS, of Jordan, in the county of Onondaga, and State of New York, have invented a new and useful Improvement in Machines for Grinding the Knives of Harvesters; and I do hereby declare that the following is a full, clear, and exact description of the same, reference being had to the annexed drawings, making part of this specification, in which—

Figure 1 is a perspective view.
Figure 2 is an elevation of part of the frame and one of the clutches, and
Figure 3 an elevation of part of the frame and one of the clamp-hooks.

The same letters, in all the figures, are used to indicate the same parts.

My improvement relates to an adjustable frame, which may be attached to any ordinary grindstone-frame, for the purpose of conveniently supporting a harvester cutter-bar in such position that the knives may be ground as is required.

In the annexed drawings, A is the bed-piece of the frame, having longitudinal slots $a\ a$, through which pass the clamp-hooks B B, which, passing through washers C, resting over the slots, are tightened by the thumb-nuts D. The frame is intended to be secured diagonally across the corners of any ordinary grindstone-frame, by means of these clamps.

The part of the frame to which the cutters are fastened, oscillates upon the bed-piece A, the posts E E being attached adjustably to such bed-piece by means of round bolts or pins F, passing through one of a series of holes through the post, so that, as the grindstone becomes worn, from use, the frame supporting the cutter-bar may be lowered, and the knives be thus maintained in contact with the stone.

The horizontal bar G passes between the posts, being fastened to them, forming a brace for the posts, and also supporting one of the clutches H, upon a sliding standard, I, fastened, by a strap, to the bar G, in such manner that it may be made easily to slide along the bar. This arrangement is necessary, for the purpose of grinding the end knives, the grindstone being permanently fixed.

The cutter-bar is intended to be secured by three U-formed clutches H, which are attached to crank-rods, passing through the posts E E, at the top, and also through the top of the standard I. The cutter-bar is fastened in the clamp by a thumb-screw.

As the several cranks are of the same length, and made to turn in the holes through which they are placed, when the nuts on their ends are loosened, the knives may be set at any required angle, and there securely held, by tightening the nuts.

This machine differs from all others in the mode of adjusting the frame and knives in relation to the stone, and in the devices for securing the cutter-bar at any required angle.

What I claim as my invention, and desire to secure by Letters Patent, is—

1. A frame, for supporting a cutter-bar upon the frame of an ordinary grindstone, constructed with an adjustable slotted bed-piece, A, and clamp-hooks B, and an oscillating support for the clutches, by which the cutter-bar is secured, substantially as described.

2. The combination of the bed-piece A, so constructed that it may be adjustably attached to the grindstone-frame, the side-pieces E, attached to the bed-piece, so as to be vertically adjustable, and the clutches, for holding the cutter-bar, substantially as described.

3. The clutches H, attached to the frame by crank-rods, so arranged that the knives may be set at any required angle, substantially as set forth.

4. In combination with the end-clutches, an intermediate clutch, attached to an adjustable standard, and sliding upon the cross-bar G, substantially as and for the purpose set forth.

In testimony whereof, I have signed my name to this specification in the presence of two subscribing witnesses.

CHARLES B. CURTIS.

Witnesses:
JOHN S. HOLLINGSHEAD,
CHAS. F. CLAUSEN.